(12) United States Patent
Harris et al.

(10) Patent No.: US 8,719,706 B2
(45) Date of Patent: May 6, 2014

(54) CLOUD-BASED APPLICATION HELP

(75) Inventors: Stacey E. Harris, Duvall, WA (US); Christopher I. Rees, Kirkland, WA (US); James S. Bradbury, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 12/797,626

(22) Filed: Jun. 10, 2010

(65) Prior Publication Data

US 2011/0307780 A1 Dec. 15, 2011

(51) Int. Cl.
*G06F 3/00* (2006.01)

(52) U.S. Cl.
USPC ........................................ 715/708

(58) Field of Classification Search
USPC .................................. 715/708, 706
See application file for complete search history.

(56) References Cited

U.S. PATENT DOCUMENTS

| | | | |
|---|---|---|---|
| 7,284,189 B1 * | 10/2007 | Lawrence et al. | 715/234 |
| 7,506,257 B1 | 3/2009 | Chavez et al. | |
| 7,518,620 B2 | 4/2009 | Faraj | |
| 2006/0085750 A1 | 4/2006 | Easton et al. | |
| 2006/0117315 A1 * | 6/2006 | Bussert et al. | 717/174 |
| 2006/0129931 A1 | 6/2006 | Simons et al. | |
| 2006/0265232 A1 | 11/2006 | Katariya et al. | |
| 2007/0185976 A1 * | 8/2007 | Solis | 709/219 |
| 2008/0229199 A1 | 9/2008 | Richardson et al. | |

OTHER PUBLICATIONS

"Beyond Software Manuals and On-line Help: Interactive Help", Retrieved at << http://www.hyperwrite.com/Articles/showarticle.aspx?id=32 >>, Retrieved Date: Mar. 4, 2010, pp. 5.

"Apple Help Concepts", Retrieved at << http://developer.apple.com/mac/library/documentation/Carbon/Conceptual/ProvidingUserAssitAppleHelp/user_help_concepts/apple_help_concepts.html >>, Retrieved Date: Mar. 4, 2010, pp. 6.

* cited by examiner

*Primary Examiner* — Thanh Vu

(74) *Attorney, Agent, or Firm* — Henry Gabryjelski; Kate Drakos; Micky Minhas

(57) ABSTRACT

A cloud help system is described herein that is a confederation of both internet and product help content that gives the user of a software application a rich web-based user interface for searching the internet in conjunction with and in the context of the software application. An application developer associates identifiers with various features and areas within an application. Upon detecting a user request for product help, the system receives the identifier and identifies instructional material related to the received identifier. The instructional material combines traditional local and online help information with dynamic content from an online data source. The online data source includes an association between each identifier and one or more searches for online content. An administrator can update the online searches over time so that new material can be incorporated.

17 Claims, 4 Drawing Sheets

CLOUD-BASED APPLICATION HELP

BACKGROUND

Software applications can perform a virtually limitless set of tasks today. Applications span all categories, from knowledge worker applications like MICROSOFT™ Word and Excel, to connectivity applications like email and instant messaging clients, to business applications like MICROSOFT™ Configuration Manager and BizTalk, to server applications like MICROSOFT™ Exchange, and so forth. Although ease of use is often a feature considered by software designers, due to the many functions that software applications provide, they cannot all work the same. Each application often involves user education to enable users to get the greatest benefit from the application and to learn each of the application's differentiating abilities.

Including instructional material directly within a software application has long been a common feature. Applications often provide a Help menu, F1 or other help invoking keystrokes, and context-sensitive help information. Help information has evolved from early information that resembled paper documentation (e.g., MICROSOFT™ HLP files with tables of contents and indexes like books) to more web-like content today with the rise of the Internet (e.g., MICROSOFT CHM files that include links, more visual content, and so forth). With the increase in continuously available Internet connections, many applications include online instructional material and client-side logic for combining both online and locally available help information.

Many online forums often develop for discussing the use of popular software products. In such forums, users may discuss how to perform specific tasks, solving problems with an application, configuring the application to behave in a certain way, and so on. Forums may include sites that span products, such as MICROSOFT™ TechNet (technet.microsoft.com), as well as product specific sites, such as www.exchangeserverhelp.com for discussing MICROSOFT™ Exchange Server. Users often locate these forums and sites using search engines through a web browser. For example, a user might search using keywords related to a particular problem the user is facing or task the user is trying to perform.

One problem with current software application instructional material is that it is very static in nature. Even for software applications that include an online component, the instructional material provided by the online component is often updated very slowly, and may not include helpful information about all of the problems a user may have with the application. Users still find that they are digging through search results to try to find an answer to obscure or unanticipated problems. Blogs and other web sites usually provide more relevant and updated content. As a result, the documentation resources of the product team are wasted, as customers scour the web for the information they desire, bypassing the already stale content delivered by the product team. In addition, customers find help through an experience that is disconnected from the application, and often loses the context of what the user is doing. This increases the amount of material that the user has to sift through to find helpful information.

SUMMARY

A cloud help system is described herein that is a confederation of both internet and product help content that gives the user of a software application a rich web-based user interface for searching the internet in conjunction with and in the context of the software application. The system is an application-scoped internet and product content search customization tool comprising: a web-based skin-able search results pane, a data repository that allows for full customization of both search scopes and search results, and application-specific client code that launches the web application in the context of the application. In some embodiments, an application developer associates identifiers with various features and areas within an application. Upon detecting a user request for product help, the system receives the identifier and identifies instructional material related to the received identifier.

The instructional material may combine traditional local and online help information, but also includes a new component from an online data source. The online data source includes an association between each identifier and one or more searches for online content. An administrator can update the online searches over time so that new material can be incorporated. Because the searches are associated with application identifiers, the user receives help scoped to the context of what the user is doing without having to guess keywords to find content related to a particular problem or feature. Integrating the system into software applications allows for the association between standard F1 Help topics and internet search results. Thus, the system supports not only standard instructional content, but also allows the user to explore related topics on the internet without leaving the context of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
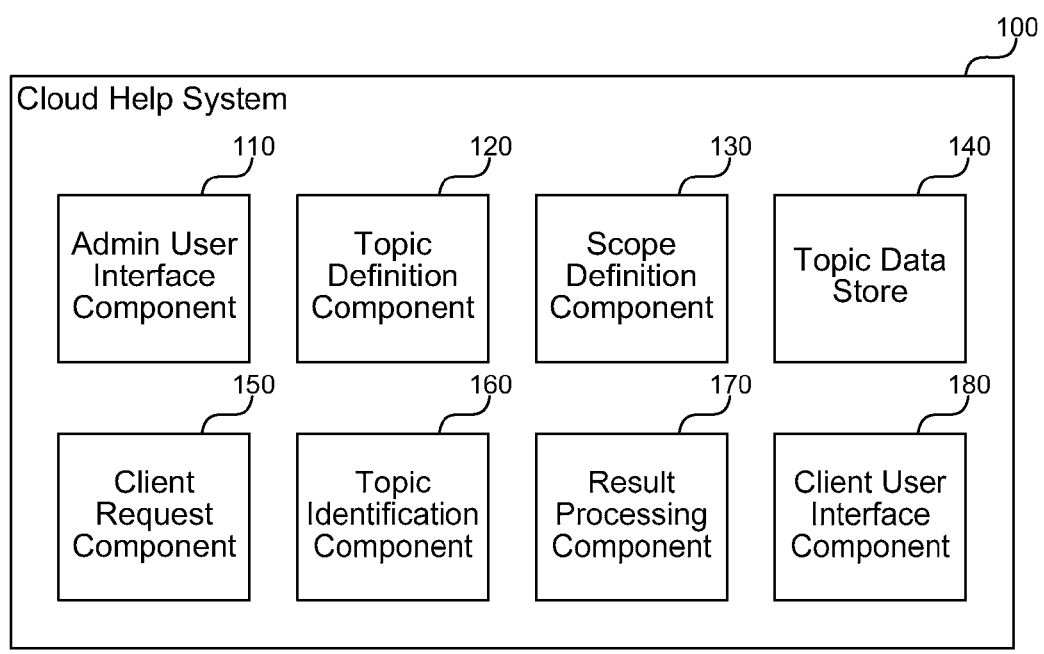
FIG. 1 is a block diagram that illustrates components of the cloud help system, in one embodiment.

A cloud help system is described herein that is a confederation of both internet and product help content that gives the user of a software application a rich web-based user interface for searching the internet in conjunction with and in the context of the software application. The system is an application-scoped internet and product content search customization tool comprising: a web-based skin-able search results pane, a data repository (database) that allows for full customization of both search scopes and search results, and application-specific client code that launches the web application in the context of the application. In some embodiments, an application developer associates identifiers (e.g., a globally unique identifier (GUID)) with various features and areas within an application (e.g., menu items, user interface controls, and so forth). Upon detecting a user request for product help, the system receives the identifier and identifies instructional material related to the received identifier.

The instructional material may combine traditional local and online help information, but also includes a new component from an online data source. The online data source includes an association between each identifier and one or more searches for online content. An administrator can update the online searches over time so that new material can be incorporated to help users use the software application. Because the searches are associated with application identifiers, the user receives help scoped to the context of what the user is doing without having to guess keywords to find content related to a particular problem or feature. Integrating the system into software applications allows for the association between standard F1 Help topics and internet search results. Thus, the system supports not only standard instructional content, but also allows the user to explore related topics on the internet without leaving the context of the application. In some embodiments, the system also provides an administrative user interface that allows the software application developer to determine the search scopes, search results, and the relationship between F1 Help topics and searches that are defined by the developer.

The cloud help system is comprised of three major areas: 1) client code/user interface that launches a cloud-based search for help information, 2) a server-based database that maps client identifiers to the latest available online help information, and 3) a web-based user interface for displaying help information. The client code includes a user interface for invoking the system. For example, a software application that provides context menus (e.g., by right clicking a mouse) may include an option on the context menu to launch a cloud-based search for help information. Internally to the application, such a request invokes the cloud help system and provides an identifier that identifies the context of the request. The system, upon receiving the identifier (e.g., in the form of a Hypertext Transfer Protocol (HTTP) request: http://127.0.0.1:81/Defaultaspx?g=0a3e4299-43f1-4ce9-805f-f3de90f14e14) will send a cloud search request to the server. After receiving a response from the server, the web-based user interface displays search results scoped to the context of the received identifier.

The database stores mappings between identifiers and online help information defined by the application developer. For example, the database may be comprised of MICROSOFT™ Azure-based table storage. In some embodiments, the database includes macros that are each associated with a different source or categorization of content, and may be surfaced in the user interface as tabs that the user can click to view results filtered by each source or category. For example, a developer might include tabs for MICROSOFT™ TechNet, MICROSOFT™ MSDN, knowledge base articles, and so forth. An example macro would be the following: site:msdn.microsoft.com/en-us/library meta:search.MSCategory (dd728630)-"(SMS SDK 2.0)". The Macros is used to scope a MICROSOFT™ Bing or other search engine search.

The database also contains all the F1 Help topic identifiers as defined by the application developer. These topic identifiers are associated with a search term. For example, the request http://127.0.0.1:81/Defaultaspx?g=0a3e4299-43f1-4ce9-805f-f3de90f14e14 contains a GUID that is associated with a "Certificates" search term. That association that is stored in the database. Finally, the database contains any fixed topic results associated with a topic identifier. For example, the "Certificates" topic has two fixed topics that the system will return to the user in addition to the internet-based search results. This allows the application developer to define product content results that are displayed before varying cloud-based results. This can also be used to define advertisements and other types of content that the application developer wants to display to the user. This feature allows the application developer to have some control over what the user experiences in their search results, while still allowing them to search for and navigate through constantly changing web-based search results.

The web-based user interface displays help results based on the searches defined in the database and the particular topic for which help was invoked by the user. The web-based user interface may include tabs corresponding to the developer-defined categories described previously. The tabs represent scoped searches that are defined by the application developer. When the user selects a tab, the system will launch a search for the present topic within that scope or filter already obtained search results to display results of the selected scope. The web-based user interface may display any fixed topics defined by the developer using a separate designation, such as a highlighted background color or bold text. Scoped search results may use a variety of sources, such as the MICROSOFT™ Bing application-programming interface (API) for web search results, the Twitter API for Twitter search results, and so on. The colors and "look" of the web-based user interface can be customized by the client application developer to increase the feel of consistency and integration with the software application. In some embodiments, users can save and share their search queries using Live Mesh or other APIs.

FIG. 1 is a block diagram that illustrates components of the cloud help system, in one embodiment. The system 100 includes an administrative user interface component 110, a topic definition component 120, a scope definition component 130, a topic data store 140, a client request component 150, a topic identification component 160, a result processing component 170, and a client user interface component 180. Each of these components is described in further detail herein.

The administrative user interface component 110 provides an interface through which a software developer can define one or more help topics and topic identifiers related to a software application. The component 110 may include a web interface, graphical user interface (GUI), or other user interface through which an administrative user or software developer can setup the system for use with the software application. The administrative user interface also receives associations between defined identifiers and one or more sources of help information related to each identifier. The sources may include internet searches, blog articles, local content, content from an online server associated with the software application, and so forth. The component 110 may also receive one or more fixed topics in the form of links or articles that the software developer would like to present to users alongside any identified variable help content.

The topic definition component 120 receives help topic definitions from the software developer through the administrative user interface. The topic definition component 120 associates an identifier with each topic and stores the identifier and any related information in a database of application help topics. Each topic entry may include a URL, script, or other metadata useful for identifying current content related to the topic. For example, a topic entry that includes keywords related to the topic entry (i.e., search terms to use for the topic) and may include the scope of the topic as a URL. Upon receiving a user request for help content related to the topic entry, the system accesses the database and invokes any metadata for identifying current content related to the topic.

The scope definition component 130 partitions available topic information by categories. For example, the software developer may define multiple sources of help content each with a separate scope, so that the client user interface can display results related to each scope in a separate tab. One scope may include MSDN articles, while another includes Twitter search results. By default, the system 100 may mix results from various sources, but upon drill down by the user may scope results to one or more scopes defined by the software developer. A software developer can use the system without scope definition, but defining scope allows the author to distinguish content that the user may want to view separately.

The topic data store 140 is a data store that stores the defined help topics for access by clients running the software application to which the topics are related. The data store may include one or more files, file systems, databases, cloud-based storage services, and other facilities for persisting data. The topic data store 140 may be connected to the internet or another network so that users running the software application from various locations can access the application help content. The mapping between help topics and search queries stored in the data store allows the system 100 to obtain current help information whenever a user searches for help. The system may cache searches so that a new search is performed on a predetermined interval (e.g., at most every hour) and not upon each user request. Even so, users receive help content that is highly current versus traditional systems that may only provide help content that is months or years old. In some embodiments, the topic data store 140 provides a locally cached component that allows disconnected users to receive previously identified help content.

The client request component 150 is a software component embedded in the software application that receives user requests for help information. The component 150 may include a library or module that the software developer calls from the software application to invoke the system 100. For example, the software application may display a context menu and, upon a user selecting a cloud search option, may invoke the system and provide a help topic identifier. The client request component 150 links the software application to the cloud help system 100 and receives results for display to the user.

The topic identification component 160 identifies a help topic associated with a help request and creates a server request for receiving content related to the identified help topic. For example, the topic identification component 160 may receive a GUID or other identifier from the software application, append the identifier to a server request URL, and issue an HTTP GET request to the server to identify related content. The server responds by looking up the identifier in the topic data store 140, invoking any script or search specified in the topic data entry, combining any fixed articles with the results, and sending the results back to the client.

The result processing component 170 receives help results related to the identified help topic. The results may be received through the server or the client may directly obtain results from one or more locations specified by the server (e.g., by issuing queries directly from the client). In some cases, the system 100 operator may pass all queries through the server so that the system 100 can gather statistics about which topics users are most frequently requesting assistance. The results processing component 170 may identify one or more scopes associated with the received help results so that users can filter received results according to a scope.

The client user interface component 180 provides a user interface to the user that displays the received help results. The component 180 may allow software developers to set theming options, such as colors, fonts, logos, and other branding or look/feel settings to integrate the user interface with a user interface of the software application. In some embodiments, the system 100 provides an API through which software developers can receive search results and draw their own user interface in which to incorporate search results.

The computing device on which the cloud help system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
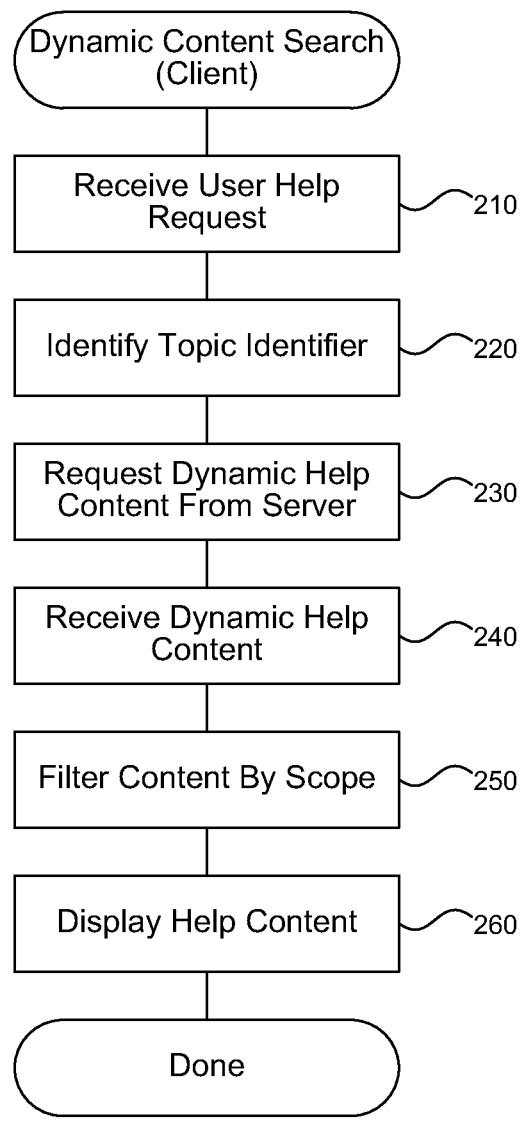
FIG. 2 is a flow diagram that illustrates processing of the cloud help system to perform a dynamic help content search from a client's perspective, in one embodiment.

FIG. 2 is a flow diagram that illustrates processing of the cloud help system to perform a dynamic help content search from a client's perspective, in one embodiment. Beginning in block 210, the system receives a user help request. For example, the user may select a menu item or press a key combination (e.g., F1) that invokes the cloud help system for help on a given topic. A software application may embed launch points for the system in various menus, controls, and other user interface elements so that the user can obtain context relevant help information from various locations within the application. Continuing in block 220, the system identifies a topic identifier associated with a context within a software application from which the user initiated the received help request. The system may associate topic identifiers with each launch point within the application from which the user can invoke the system. The application provides the topic identifier to the system as a parameter upon invoking the system to receive help information.

Continuing in block 230, the system requests dynamic help content from a server, wherein the request specifies the identified topic identifier. In some embodiments, the client application opens a web browser with a predetermined URL for dynamic help content, provides the identified topic identifier as a query string or other URL component, and then issues an HTTP GET request using the URL. The server response is provided as an HTTP response and can be viewed in the opened browser window. Alternatively or additionally, the query string may include one or more search terms. The client may also request an initial scope (e.g., only TechNet articles)

based on user-specified configuration settings or application defaults. Continuing in block 240, the system receives dynamic help content from the server in response to the request. The content may include up to date content from a variety of sources, such as search engines, social networking sites, blogs, and so forth. The server determines sources from which to request content based on the identified topic identifier, so that the user receives up to date content specific to the current context of the user within the software application.

Continuing in block 250, the system optionally filters the received content by scope. In some cases, a software developer or system administrator may partition available sources into scopes, so that search results of dynamic help content are categorized in each scope. The scope may be divided by individual sites (e.g., MSDN, TechNet) or may include multiple sites grouped by type (e.g., Blogs, Developer Sites). The system may filter content by scope on either the server or the client. If filtered on the client, the client receives all of the results with an identification of a scope to which each result belongs. As the user selects different scopes, such as by selecting tabs in the user interface, the system displays those results that belonging to the currently selected scope. If filtered on the server, the client receives one scope of results and issues new requests to the server upon the user selecting a different scope.

Continuing in block 260, the system displays the received dynamic help content to the user. The system may display the content in a web browser either separate from or integrated within the application. The system may display the content as a list of results or any other user interface paradigm that allows the user to find and read relevant help content. In some embodiments, the client receives one or more fixed articles from the server that the client displays along with any dynamically received results. The client may highlight such results to call the user's attention to them or may list them first in a list so that the user is aware of the fixed results. The fixed results may include articles voted most relevant by other users, an answer to a problem that the application developer deems most helpful, advertisements, or other types of content. In some embodiments, the client sends statistical information about the results the user selects to the server and whether the result was helpful to the user (e.g., based on the user clicking a like or dislike button). This allows an administrator to determine popular results over time and consider those results for designation as fixed articles. After block 260, these steps conclude.

Figure 3:
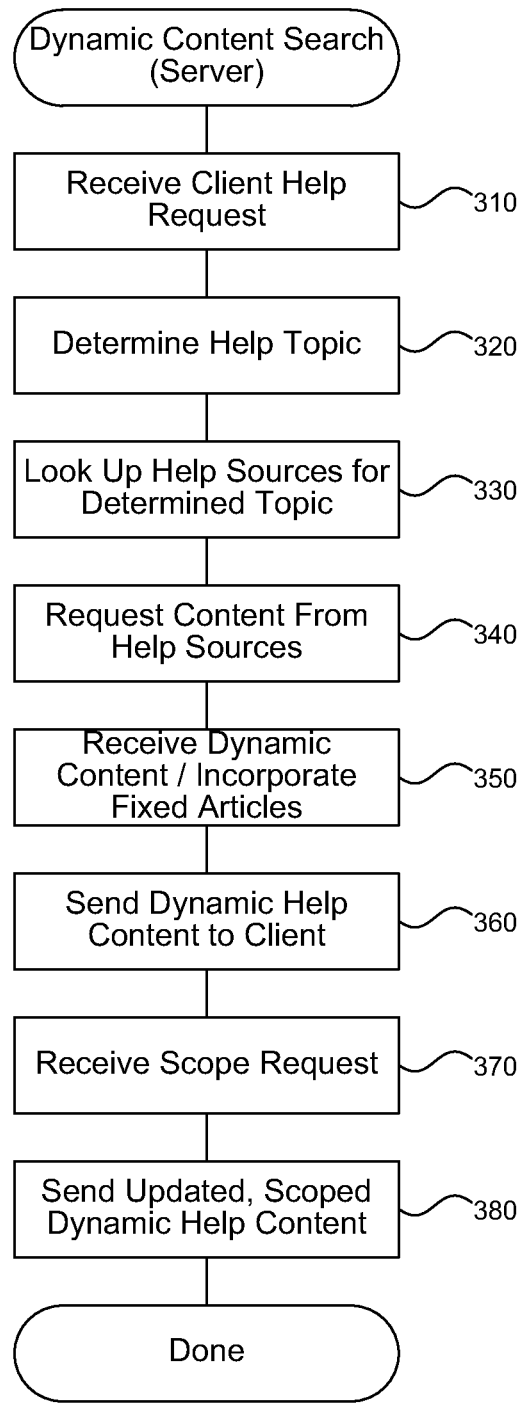
FIG. 3 is a flow diagram that illustrates processing of the cloud help system to perform a help content search from a server's perspective, in one embodiment.

FIG. 3 is a flow diagram that illustrates processing of the cloud help system to perform a help content search from a server's perspective, in one embodiment. Beginning in block 310, the system receives at a server a client request for dynamic help content, wherein the request includes a topic identifier. The request may originate from a software application as described with reference to FIG. 2. The client uses the server to receive up to date help content from a variety of sources while still allowing the software developer to maintain some control over the content and the client experience. The developer may define one or more searches expected to produce relevant content for each topic and store a mapping between the searches and topics for retrieving dynamic help content in response to client requests.

Continuing in block 320, the system determines a help topic associated with the client request based on the included topic identifier. The system may extract the identifier as a parameter from the request and use the identifier in the following look up. In some cases, the request may include other information that the server extracts, such as keywords, a client identifier, and so on. The server may combine the keywords in a search based on the topic identifier to identify results that match both. The server may use the client identifier to gather client statistics, verify product registration, and so forth. Continuing in block 330, the system looks up help sources associated with the determined help topic. For example, the system may look up a received topic GUID in a MICROSOFT™ AZURE™ table to retrieve search terms, search scope, and any fixed articles associated with the topic GUID. An administrator can update the table or other database over time as new sources of helpful information become available, so that users receive the benefit of dynamically changing and highly up to date help content.

Continuing in block 340, the system requests help content from the looked up help sources. Each source may include a URL, script, web service API, or other identifier of an online source of help information related to the software application. For example, if a source is MICROSOFT™ BING™, then the system may invoke the BING™ Simple Object Access Protocol (SOAP) API to perform a search passing any information received in the request or found in the lookup table, such as keywords related to the determined topic and scoping information. Continuing in block 350, the system receives dynamic help content results and optionally incorporates zero or more fixed articles identified by the look up into the received results. Fixed articles are those content articles that a software developer or administrator wants users of the software application to receive statically regardless of any dynamic results identified by the requests to online help sources.

Continuing in block 360, the system sends the received dynamic help content to the client in response to the client request. The dynamic help content may include articles or other information from a variety of sources related to the determined topic. Unlike previous systems, the client can receive help content not controlled or produced by the software developer and that is updated more frequently than prior local or online help sources. For example, a user may receive a help result that includes a blog posting made just hours before and identified by a search request to a search engine.

Continuing in block 370, the system optionally receives a scope request from the client that requests that the server filter results to a particular scope. The scope may include certain sources and not others or may include keywords or other filtering criteria used to eliminate some results or rank results in a different order. For example, one scope may only include MSDN articles from the MICROSOFT™ MSDN website. Continuing in block 380, the system sends updated results to the client that are scoped to the particular scope requested by the client. After block 380, these steps conclude.

Figure 4:
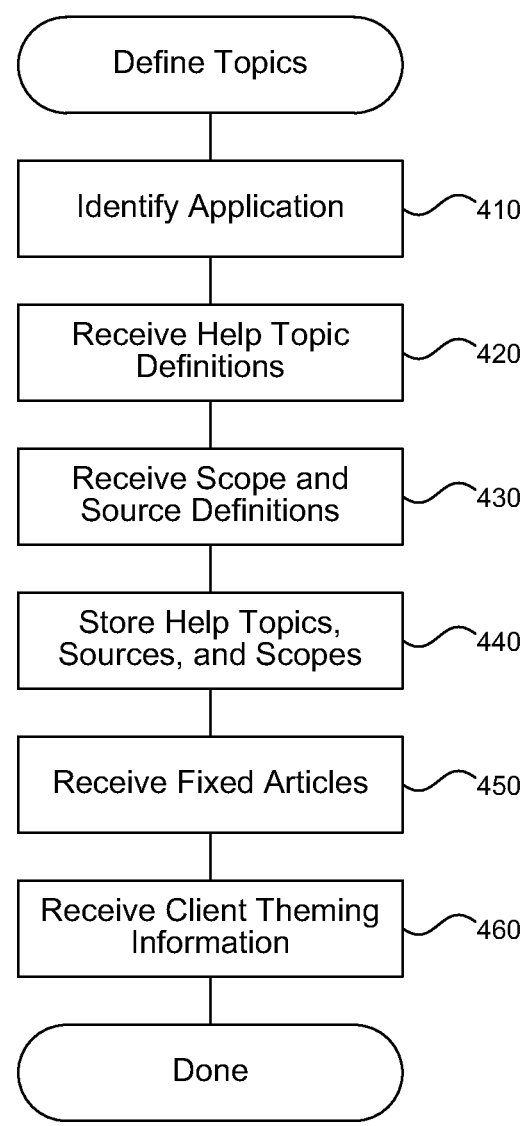
FIG. 4 is a flow diagram that illustrates processing of the cloud help system to define one or more help topics, in one embodiment.

FIG. 4 is a flow diagram that illustrates processing of the cloud help system to define one or more help topics, in one embodiment. Beginning in block 410, the system identifies an application with which to associate received help topic definitions. For example, an application administrator may log into a server hosting a help system and identify an application to configure. The server may host help sources for multiple applications.

Continuing in block 420, the system receives help topic definitions that indicate one or more contexts within a software application for which an application user can receive dynamic help content. For example, an application developer may define help topics for each menu item, feature, control, and other application elements. The system may create an identifier for each defined topic that can be used by client and server to specify a particular topic. Continuing in block 430, the system receives one or more scope and source definitions. A source definition is associated with a topic and identifies a source from which the system can obtain dynamic help content. Sources may include URLs to individual articles within search engines, blogs, code repositories, social networks, and other sources of content. A scope definition defines one or more categories in which sources are grouped (e.g., blogs for grouping all blog sources) so that a request for dynamic help can filter out some results and include others by selecting a scope. Scopes may apply to content types such as search engine results in one scope and blog articles in another, or may subdivide content by source, such as MSDN articles versus Knowledge Base articles.

Continuing in block 440, the system stores the received topic, scope, and source definitions in a data store. The data store may include a database, cloud-based storage service, or other storage facility that a client can access to lookup sources associated with topics and to filter results by scope. An administrator may update the source and scope definitions over time to include new sources or to remove less relevant sources. So long as the set of topic definitions can be agreed upon in advance, no changes to the client software application to receive new dynamic help content. However, the software developer may also update the application to include new topic definitions and add those definitions to the server with associated sources.

Continuing in block 450, the system receives one or more fixed articles associated with a defined topic. The fixed articles are static content that are returned in response to client requests along with each request for dynamic help content associated with a topic. The fixed articles may include reliable solutions to problems, advertisements, or other content. Continuing in block 460, the system receives client theming information that conforms the client experience to a user experience defined by the software developer. For example, the software developer may include one or more logos, colors, fonts, backgrounds, and so forth so that the server returns search results in a format that closely matches that of the client application. This gives the user a more integrated feel between the software application and the cloud help system. In some embodiments, the system returns dynamic help content as one or more web pages and allows the software developer to specify one or more templates for formatting the web pages. After block 460, these steps conclude.

In some embodiments, the cloud help system can be launched either within a software application or by navigating to a web site in a web browser. Launching from within the application will invoke a search based on predetermined search terms and context (i.e., a determinate search). Launching from a web browser does not include such context, and asks the user to specify both and search terms and in which contexts to search (i.e., an indeterminate search).

For a determinate search, the user will have already opened one of the associated software applications (e.g., MICROSOFT™ System Center console applications). If the user selects the "Search" context menu item from one of the node's right-click menus, the system will navigate a browser window associated with the system using a URL with the following example format: http://cloudsearch.cloudapp.net/ g={GUID}. The GUID specified in the query string is a key that is stored in data store. When the system parses the URL and retrieves the GUID, the system will be able to retrieve appropriate search terms and context of the search. The context of the search is typically a URL to which the search is to be scoped. For example, if the system receives 3ad39fd2- efd6-11d0-bdcf-00a0c909fdd7, the data store will map that help topic to the search term "Site Management." In addition to discovering the search term and context based off the received GUID, the system retrieves any fixed topics that have been stored in the data store. These fixed topics are associated with the GUID and allow the application to consistently return these static results to the user alongside the dynamic results returned by the search engine.

Indeterminate search works similar to determinate search, except that the system does not need to find the context or search term in the data store. The URL used to get search results is one of the following example URLs: http://cloud-search.cloudapp.net/ or http://cloudsearch.cloudapp.net/ q=SearchTerm. Note that indeterminate search permits the calling application to specify a search term in order to get results from a search engine on load. If the search term is not specified, the user may type a search term manually.

In some embodiments, the cloud help system includes a client installation process that integrates the system with an installed software application. For example, the installation process may copy one or more extensible markup language (XML) files to the client that include application customizations to context menus and other user interface elements to provide launch points for the system within the software application. Upon load, the application may add a "Search" context menu item to each one of the context menus associated with nodes specified in the XML. The context menu items invoke the cloud help system with the appropriate context information. Following is example XML for launching the system from MICROSOFT™ System Center:

```
<ActionDescription Class="Executable" DisplayName="cloud Search"
MnemonicDisplayName="Bing Search" Description = "Bing search for
context relevant information.">
<Executable>
<FilePath>"C:\Program Files\Internet Explorer\iexplore.exe"</FilePath>
<Parameters>http://sccloudsearch.cloudapp.net/default.aspx?g=0ae7814c-
1256-4358-b5a6-710f64ba2188</Parameters>
</Executable>
</ActionDescription>
```

The system may also include a corresponding server installation process that prepares a server to receive client help requests. From the user's perspective, server installation may include downloading MICROSOFT™ SILVERLIGHT™ binaries and loading a client application from within a web browser. The user may or may not provide any personal or account information. On the server side, installation involves populating a data store with help topics and sources associated with each help topics from which the server can obtain help information.

In some embodiments, the cloud help system stores a list of macros that are used to scope search engine searches queries in order to provide scoped search options for the user. The following table is an example of some macros the system may make available to the user to dynamically search for help content. The following example macros use the MICROSOFT™ BING™ API and Twitter API to query for help data. These macros are loaded into the user interface in the form of tabs. Each macro name is represented by a tab. When the user clicks on a tab, the system performs a search with that macro.

| | |
|---|---|
| Learning | site: www.microsoft.com/learning/en/ \"Configuration Manager\" |
| WebCasts | site: msevents.microsoft.com \"Configuration Manager\" |
| TechNet Library | site: technet.microsoft.com/en-us/library meta:search.MSCategory(bb735902) |
| KB Articles | site: support.microsoft.com/kb \"System Center Configuration Manager\" |
| Twitter | Configuration Manager |
| TechNet Center | site: technet.microsoft.com/en-us/configmgr/ |
| Scripts | (site: http://gallery.technet.microsoft.com/ScriptCenter/en-us/) |
| Download Center | site: www.microsoft.com/downloads/ \"Configuration Manager\" |
| Videos/Media | site: edge.technet.com \"Configuration Manager\" |
| Forums | site: social.technet.microsoft.com/Forums/en-US/ "System Center Configuration Manager Forums" |
| MSDN | site: msdn.microsoft.com/en-us/library meta:search.MSCategory(aa155072) |
| Web | site: forums.microsoft.com/TechNet/ OR |
| | site: www.myitforum.com/forums/) \"System Center Configuration Manager\") |
| Blogs | site: blogs.technet.com/configmgrteam/ OR |
| | site: blogs.technet.com/configurationmgr/ OR |
| | site: blogs.msdn.com/steverac/ OR |
| | site: blogs.technet.com/wemd_ua_-_sms_writing_team/ OR |
| | site: blogs.technet.com/inside_osd/ OR |
| | site: blogs.msdn.com/rodneyj/ OR |
| | site: blogs.msdn.com/rslaten/ OR |
| | site: blogs.technet.com/jasonlewis/ OR |
| | site: blogs.msdn.com/ameltzer/ OR |
| | site: scug.be/blogs/sccm/ OR |
| | site: www.msfaq.se/ OR |
| | site: configmgr.com/ OR |
| | site: myitforum.com/cs2/blogs/ "cstauffer" OR |
| | site: myitforum.com/cs2/blogs/ "cmosby" OR |
| | site: blogcastrepository.com/blogs/kim_oppalfenss_systems_management_ideas/ OR |
| | site: myitforum.com/cs2/blogs/ "rodtrent" OR |
| | site: oehoeven.spaces.live.com/ OR |
| | site: blog.quirkshop.co.uk/ OR |
| | site: trevorsullivan.wordpress.com/ OR site: mariusvilemaitis.wordpress.com/ OR |
| | site: myitforum.com/cs2/blogs "jsandys" OR |
| | site: verbalprocessor.com/ OR |
| | site: blog.frode.org/ OR |
| | site: configmgr.spaces.live.com/ OR |
| | site: www.gilham.org/Blog/ OR |
| | site: www.whitworth.org/ "configuration manager" OR |
| | site: sccmnap.com/blogs/ OR |
| | site: myitforum.com/cs2/blogs/ "pthomsen" OR |
| | site: myitforum.com/cs2/blogs/ "chobbs" OR |
| | site: myitforum.com/cs2/blogs/ "jnelson" OR |
| | site: msmvps.com/blogs/daniel/ OR |
| | site: myitforum.com/cs2/blogs/ "scassells" OR |
| | site: blog.hznet.nl/tag/configuration-manager/ OR |
| | site: wmug.co.uk/blogs/r0b/ OR |
| | site: smsug.ca/blogs/garth_jones/ OR |
| | site: www.systemcentercentral.com/ "Configuration Manager" |

In some embodiments, the cloud help system includes a client-side database in addition to or as an alternate to the server database. For example, the software developer may provide a client-side XML file or other data store that includes each of the mappings between topic identifiers and dynamic help sources. The software loses some ability to update the data store, but can provide a new XML file as an update to the application to add or modify data sources and scope information. The system may also use a client-side database where connectivity to the server is unavailable or interrupted, so that the client can receive some results without dependency on the server. The client in such cases may also upload statistics to a server later so that the server can collect usage information even if a server-based system is not being used to provide topic mappings.

In some embodiments, the cloud help system receives custom search options form a software developer related to a particular application. The software developer may host his own help content (e.g., forums, articles) related to the application and may include that help information as one scope of help from which the user can receive dynamic results. This custom search may be presented alongside other scopes such as blogs, Twitter feeds, and so forth.

In some embodiments, the cloud help system provides automatic help information as a user navigates through a software application. Instead of waiting for the user to select a context menu option or invoke help through a keystroke (e.g., F1), the system may receive indications from the software application as the user selects menu items, controls, or other user interface features. This allows the system to automatically update a help pane or other window of help content so that the user can view helpful information alongside the application that is constantly relevant based on what the user is currently doing in the application. In some embodiments, the help information may span applications so that as a user switches from application to application a help pane is updated with currently relevant information for the application the user is using.

In some embodiments, the cloud help system provides advertisements embedded within help information. For example, some sources of information may charge for their content. To pay for including such sources, the software developer may place advertisements within the help content to recoup costs or may allow content sources to embed advertisements in exchange for providing content without charge. The software developer may include advertisements as fixed articles displayed as peers to search results, as banners surrounding search results, embedded within particular articles, or anywhere else applicable.

From the foregoing, it will be appreciated that specific embodiments of the cloud help system have been described herein for purposes of illustration, but that various modifications may be made without deviating from the spirit and scope of the invention. Accordingly, the invention is not limited except as by the appended claims.

We claim:

1. A computer-implemented method for providing dynamic help content to a software application running on a client computer, the method comprising:
    receiving at a server a client request for dynamic help content, wherein the request includes a topic identifier;
    determining a help topic associated with the client request based on the included topic identifier;
    looking up in a data store one or more help sources associated with the determined help topic;
    requesting help content from the looked up help sources;
    receiving dynamic help content results wherein the dynamic help content results include one or more help contents not produced by a software developer of the software application;
    identifying one or more fixed articles in the one or more help sources; and
    sending the received dynamic help content to the client in response to the client request, along with at least one of the one or more fixed articles, as a combined result,
    wherein the preceding steps are performed by at least one processor.

2. The method of claim 1 wherein receiving the client request comprises receiving a request using a Uniform Resource Locator (URL) that specifies a dynamic help server and the topic identifier.

3. The method of claim 1 wherein determining the help topic comprises extracting the topic identifier as a parameter from the request.

4. The method of claim 1 wherein determining the help topic comprises identifying keywords submitted in addition to the topic identifier in the received client request.

5. The method of claim 1 wherein looking up one or more help sources comprises accessing a cloud-based storage service that includes a stored mapping between topic identifiers and help sources.

6. The method of claim 1 wherein looking up one or more help sources comprises accessing an administrator updatable list of help content sources at least one of which contains dynamic help content.

7. The method of claim 1 wherein requesting help content comprises invoking a web services application programming interface (API) of a search engine to identify one or more search results related to the determined topic.

8. The method of claim 1 further comprising receiving a scope request from the client that requests that the server filter results to a particular scope and sends in response updated results to the client that are scoped to the particular scope requested by the client.

9. A computer system for providing online content related to a software application to a user, the system comprising:
    a processor and memory configured to execute software instructions;
    an administrative user interface component configured to provide an interface through which a software developer can define one or more help topics and topic identifiers related to the software application wherein the administrative user interface is further configured to receive one or more fixed topics to present to users alongside any identified variable help content wherein the fixed topics are topics that are presented to users regardless of content associated with the identified variable help;
    a topic definition component configured to receive help topic definitions form the software developer through the administrative user interface;
    a scope definition component configured to partition available topic information by one or more categories;
    a topic data store configured to store the defined help topics for access by clients running the software application to which the topics are related;
    a client request component configured to provide a software component embedded in the software application that receives user requests for help information;
    a topic identification component configured to identify a help topic associated with a help request and create a server request for receiving content related to the identified help topic;
    a result processing component configured to receive one or more help results related to the identified help topic along with the one or more fixed topics; and
    a client user interface component configured to provide a user interface to the user that displays the received help results.

10. The system of claim 9 wherein the administrative user interface is further configured to receive associations between defined identifiers and one or more sources of help information related to each identifier.

11. The system of claim 9 wherein the scope definition component is further configured to receive multiple sources of help content each with a separate scope, so that the client user interface can display results related to each scope separately.

12. The system of claim 9 wherein the topic identification component is further configured to receive a globally unique identifier (GUID) from the software application, add the identifier to a server request Uniform Resource Locator (URL), and issue a Hypertext Transfer Protocol (HTTP) request to the server to identify related content.

13. The system of claim 9 wherein the result processing component is further configured to identify one or more scopes associated with the received help results so that users can filter received results according to a selected scope.

14. The system of claim 9 wherein the client user interface component is further configured to receive client theming information from the software developer to integrate the user interface with a user interface of the software application.

15. A computer-readable storage medium comprising instructions for controlling a computer system to define one or more topics for dynamically retrieving help information for a software application, wherein the instructions, upon execution, cause a processor to perform actions comprising:
    identifying an application with which to associate received help topic definitions;
    receiving one or more help topic definitions that indicate one or more contexts within a software application for which an application user can receive dynamic help content;
    receiving one or more source definitions, wherein a source definition is associated with a topic and identifies a source from which the system can obtain dynamic help content;

storing the received topic and source definitions in a data store;

receiving one or more fixed articles associated with the received help topic definitions, where the one or more fixed articles are to be returned along with the dynamic help content where the one or more fixed articles are articles that a software developer or administrator wants users of the software application to receive regardless of any other results; and receiving client theming information such that the computer system can return dynamic help content results to the application in a format consistent with the format used by the application.

16. The medium of claim 15 further comprising receiving one or more scope definitions that define one or more categories in which sources are grouped so that a request for dynamic help content can filter out some results and include others by selecting a scope.

17. The medium of claim 15 wherein the data store includes a storage facility that a client can access to lookup sources associated with topics and that an administrator can update to modify source definitions over time to include new sources or to remove less relevant sources.

\* \* \* \* \*